United States Patent [19]

Bueltjer et al.

[11] Patent Number: 4,469,831
[45] Date of Patent: Sep. 4, 1984

[54] MOISTURE-CURING, STORAGE STABLE, SINGLE-COMPONENT POLYURETHANE SYSTEMS

[75] Inventors: Uwe Bueltjer, Ludwigshafen; Heinrich Horacek, Frankenthal; Wolfgang Druschke, Dirmstein; Gernot Franzmann, Bobenheim; Erhard Klahr, Ludwigshafen; Hans-Juergen Foerster, Bobenheim-Roxheim, all of Fed. Rep. of Germany

[73] Assignee: BASF Aktiengesellschaft, Ludwigshafen, Fed. Rep. of Germany

[21] Appl. No.: 489,538

[22] Filed: Apr. 28, 1983

Related U.S. Application Data

[63] Continuation-in-part of Ser. No. 411,541, Aug. 25, 1982, abandoned.

[51] Int. Cl.³ .............. C08G 18/16; C08G 18/38; C08K 5/15; C08K 3/26
[52] U.S. Cl. .................... 524/112; 524/425; 528/48; 528/49; 528/59; 528/61
[58] Field of Search ............ 528/59, 61, 49, 48; 524/112, 425

[56] References Cited

U.S. PATENT DOCUMENTS

| | | | |
|---|---|---|---|
| 3,239,480 | 3/1966 | Windemuth et al. | 528/52 |
| 3,489,723 | 1/1970 | Kraft | 260/77.5 |
| 3,493,543 | 2/1970 | Nazy et al. | 528/67 |
| 3,523,925 | 8/1970 | Kamal et al. | 528/68 |
| 3,595,839 | 7/1971 | Stokes | 528/44 |
| 3,682,867 | 8/1972 | Shackelford et al. | 528/44 |
| 3,753,933 | 8/1973 | Olstowski et al. | 260/2.5 |
| 3,789,045 | 1/1974 | Coury et al. | 528/49 |

FOREIGN PATENT DOCUMENTS

| | | |
|---|---|---|
| 1064841 | 4/1967 | United Kingdom . |
| 1073209 | 6/1967 | United Kingdom . |
| 1125836 | 9/1968 | United Kingdom . |
| 1575666 | 9/1980 | United Kingdom . |

*Primary Examiner*—H. S. Cockeram
*Attorney, Agent, or Firm*—Joseph D. Michaels

[57] ABSTRACT

The object of this invention is a moisture-curing, storage stable, single-component polyurethane system comprising:

A. a polyurethane prepolymer with a free isocyanate content of 1 to 5 percent by weight;
B. a dialdimine having the formula

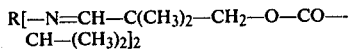

in which
R is a divalent aliphatic radical with 2 to 10 carbon atoms, aliphatic radical having 4 to 10 carbon atoms and containing ether oxygen and/or lower alkylamino nitrogen atoms, cycloaliphatic radical with 6 to 15 carbon atoms or aromatic radical with 6 to 21 carbon atoms;

and
C. an acid catalyst selected from the group consisting of aliphatic carboxylic acids, aromatic carboxylic acids, toluenesulfonic acid, and mixtures thereof.

The polyurethane systems are used as coating, sealing, casting, spackling and bonding materials.

10 Claims, No Drawings

MOISTURE-CURING, STORAGE STABLE, SINGLE-COMPONENT POLYURETHANE SYSTEMS

CROSS REFERENCE TO RELATED APPLICATION

This application is a continuation-in-part of U.S. patent application Ser. No. 411,541, filed Aug. 25, 1982, and now abandoned.

BACKGROUND OF THE INVENTION

1. Field of the Invention

This invention pertains to the field of single-component, moisture-curing, polyurethane systems for use in coatings, adhesives, and similar applications. The systems contain a polyurethane prepolymer, certain dialdimines, and certain acid catalysts.

2. Description of the Prior Art

The use of moisture-sensitive amine derivatives such as aldimines and ketimines as latent hardeners for polyisocyanates is known. In the presence of moisture, the aforementioned amine derivatives form free amines which react with the polyisocyanates by forming urea and biuret groups.

Polyaldimines and polyketimines as well as their use as mixtures with polyisocyanates are described, for instance, in British Pat. Nos. 1,064,841 and 1,073,209, U.S. Pat. Nos. 3,493,543 and 3,523,925 and French Pat. No. 1,493,879 (British Pat. No. 1,125,836). In most cases, however, the storage stability of the mentioned compounds is unsatisfactory.

While the products described in German Application No. 21 25 247 and German Published Application No. 26 51 479 (British Pat. No. 1,575,666) show improvements compared with the compounds according to the then existing state of the art, their storage stability, particularly in the presence of acid, is still insufficient for application in single-component polyurethane systems.

SUMMARY OF THE INVENTION

The object of this invention is a moisture-curing, single-component polyurethane system which, in the absence of moisture, shows increased storage stability over prior art products and, upon exposure to moisture, shows rapid skin formation and curing.

The product of this invention is a moisture-curing, storage stable, single-component polyurethane system comprising:

A. a polyurethane prepolymer with a free isocyanate content of 1 to 5 percent by weight;

B. a dialdimine chain extender having the formula

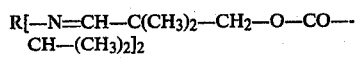

in which
R is a divalent aliphatic radical with 2 to 10 carbon atoms, aliphatic radical having 4 to 10 carbon atoms and containing ether oxygen and/or lower alkylamino nitrogen atoms, cycloaliphatic radical with 6 to 15 carbon atoms or aromatic radical with 6 to 21 carbon atoms;

and

C. an acid catalyst selected from the group consisting of aliphatic carboxylic acids, aromatic carboxylic acids, toluenesulfonic acid, and mixtures thereof.

The product is storage stable in the absence of moisture for at least six months and, upon exposure to moisture, forms a skin within less than 90 minutes, and cures completely (1 mm) in less than 24 hours.

DESCRIPTION OF THE PREFERRED EMBODIMENTS

The following raw materials are suited for the preparation of the moisture-curing, storage stable, single-component polyurethane systems in accordance with this invention:

A. The polyurethane prepolymers are reaction products of excess quantities of organic polyisocyanates with polyols.

Preferably used as organic polyisocyanates are aliphatic and/or cycloaliphatic diisocyanates. Detailed examples include: aliphatic diisocyanates such as ethylene, 1,4-tetramethylene, 1,6-hexamethylene and 1,12-dodecane diisocyanates and cycloaliphatic diisocyanates such as cyclohexane-1,3 and -1,4 diisocyanates as well as any desired mixture of these isomers, 1-isocyanato-3,3,5-trimethyl-5-isocyanatomethylcyclohexane (IPDI), 2,4- and 2,6-hexahydrotoluene diisocyanate as well as any desired mixtures of these isomers, 4,4'- and 2,4'-diisocyanatodicyclohexylmethane.

IPDI, 4,4'-diisocyanatodicyclohexylmethane and 1,6-hexamethylenediisocyanate as well as any desired mixtures of these diisocyanates have proven to work particularly well and are, therefore, used on a preferred basis.

Suitable reaction partners for the above-mentioned polyisocyanates for the preparation of polyurethane prepolymers are polyols, preferably commonly used linear and/or branched polyester polyols, and particularly polyether polyols with molecular weights of approximately 200 to 8000, preferably 800 to 5000, and particularly 1800 to 3500. However, other hydroxyl group-containing polymers with the above-mentioned molecular weights, for instance, polyester amides, polyacetals and polycarbonates, particularly those prepared from diphenylcarbonate and 1,6-hexanediol by way of transesterification are also suitable.

The polyester polyols may be prepared, for example, from dicarboxylic acids, preferably aliphatic dicarboxylic acids having 2 to 12, preferably 4 to 8 carbon atoms in the alkylene radical and multifunctional alcohols, preferably diols. Examples include aromatic dicarboxylic acids such as phthalic and terephthalic acids and aliphatic dicarboxylic acids such as glutaric acid, pimelic acid, suberic acid, azelaic acid, sebacic acid, undecanedioic acid, dodecanedioic acid, and, preferably, succinic acid and adipic acid. Examples of multifunctional, particularly bi- and tri-functional, alcohols are: ethylene glycol, diethylene glycol, 1,2-propylene glycol, trimethylene glycol, dipropylene glycol, 1,10-decanediol, glycerin, trimethylolpropane and, preferably, 1,4-butanediol and 1,6-hexanediol.

The polyester polyols have molecular weights of 300 to 2800, preferably of 300 to 2000, and hydroxyl numbers of 30 to 700, preferably 50 to 500.

However, preferably used as polyols are polyether polyols which are prepared according to known processes from one or more cyclic ethers with 2 to 4 carbon atoms in the alkylene radical and an initiator molecule which contains 2 to 8, preferably 2 to 4 active hydrogen atoms.

Suitable cyclic ethers include, for example, tetrahydrofuran, 1,3-trimethylene oxide, 1,2- or 2,3-butylene oxide and, preferably, ethylene oxide and 1,2-propylene oxide. The cyclic ethers may be used individually, alternatingly in sequence or as mixtures.

Suitable initiator molecules include, for example: water, organic dicarboxylic acids such as succinic acid, adipic acid, phthalic acid and terephthalic acid and, preferably, multifunctional, particularly di- and/or trifunctional alcohols such as ethylene glycol, 1,2-propylene glycol, 1,3-propanediol, diethylene glycol, dipropylene glycol, 1,4-butanediol, 1,6-hexanediol, glycerin, trimethylolpropane and pentaerythritol.

The polyester amides include, for example, the predominantly linear condensates produced from multifunctional, saturated and/or unsaturated carboxylic acids and/or their anhydrides and multifunctional saturated and/or unsaturated amino alcohols or mixtures of multifunctional alcohols and amino alcohols and/or polyamines.

Suitable polyacetals include, for example, the compounds obtainable from glycols such as diethylene glycol, triethylene glycol, 4,4'-dihydroxyethoxydiphenylpropane-2,2, or hexanediol and formaldehyde. Polyacetals suited for the purpose of this invention may also be prepared by polymerization of cyclic acetals such as trioxane.

Suitable hydroxyl group-containing polycarbonates are those of a basically known type which are obtained, for example, by reacting diols such as 1,3-propanediol, 1,4-butanediol and/or 1,6-hexanediol, diethylene glycol, triethyleneglycol, tetraethylene glycol with diarylcarbonates, for example, diphenylcarbonate or phosgene.

The polyols may be used individually or in the form of mixtures. For the preparation of polyurethane prepolymers, low molecular weight chain extenders or cross-linking agents may optionally be used in quantities of 0 to 100, preferably 20 to 50 hydroxyl equivalent percent based on the overall amount of polyols. Suitable for this purpose are polyfunctional, particularly di- and/or trifunctional, compounds with molecular weights of 18 to 600, preferably 60 to 300. Preferably used are aliphatic diols and triols with 2 to 6 carbon atoms such as ethylene glycol, 1,4-butanediol, 1,6-hexanediol, glycerin and trimethylolpropane.

For the preparation of polyurethane prepolymers, the polyol or the polyol mixture and, optionally, the chain extender or cross-linking agent are reacted with excess polyisocyanate in a basically known fashion in such quantity ratios that the resultant polyurethane prepolymers have a free isocyanate content of 1 to 5, preferably 1 to 3 percent by weight. Polyurethane prepolymers are understood to be monomer-free isocyanate group-containing prepolymers as well as their mixtures with excess monomeric diisocyanate.

B. A significant characteristic of this invention is the use of dialdimines having the formula

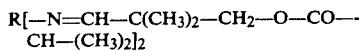

in which R has the above-mentioned meaning. The dialdimines may be used individually or as mixtures.

For the preparation of the dialdimines, the aliphatic, cycloaliphatic and/or aromatic diamines are mixed with an excess of 3-isobutyroxy-2,2-dimethylpropanal, preferably in an amine to aldehyde group ratio of 1:1.01 to 1:1.3, particularly 1:1.05 to 1:1.1. After adding a suitable solvent such as toluene, benzene, octane, dichloroethane or, preferably, heptane, the mixture is heated in the presence of a gas which is inert under the reaction conditions of the water separation until the water separation is completed. Generally, this requires reaction times of 1 to 10 hours.

It is not absolutely essential to purify the dialdimine, for instance, by distillation. After removing the excess 3-isobutyroxy-2,2-dimethylpropanal and the solvent by distillation, the product may also be used directly.

Suited for the preparation of dialdimines are aliphatic diamines with 2 to 10, preferably 2 to 6 carbon atoms such as 1,4-butanediamine, 1,5-pentadiamine, 1,6-hexanediamine, 1,7-heptanediamine, 1,8-octanediamine and 1,10-decanediamine. Diamines with 4 to 10 carbon atoms which contain ether oxygen and/or 1 to 4 carbon alkylamino nitrogen atoms in the chain have also proven to work well. Examples include bis-(2-aminoethyl) ether, N-methyl- or N-ethyldiethylenetriamine and 4,7-dioxadecane-1,10-diamine. Suitable cycloaliphatic diamines with 6 to 15, preferably 6 to 13 carbon atoms include, for example, 1,2-, 1,3- and 1,4-diaminocyclohexane and the corresponding isomer mixtures; 3-aminomethyl-3,5,5-trimethylcyclohexylamine (IPDA); 2,4- and 2,6-hexahydrotoluenediamine as well as any desired mixtures of these isomers; 2,2'-, 2,4'-, 4,4'-diaminobicyclohexyl, 2,2'-, 2,4'- and 4,4'-diaminodicyclohexylmethane, -propane-2,2, ether, sulfide and sulfone as well as the corresponding isomer mixtures of the individual classes of compounds.

If the moisture-curing, storage stable, single-component systems according to this invention need not be highly resistant to ultraviolet radiation, it is advantageous to use aromatic diamines for the preparation of the dialdimines. Examples for aromatic diamines with 6 to 21, preferably 7 to 13 carbon atoms include; 1,3-, 1,4-phenylenediamine; 2,4-, 2,6-toluenediamine; 4,4'-, 2,4'- and 2,2'-diaminodiphenyl; 4,4'-, 2,4'-, and 2,2'-diaminodiphenylmethane, -propane-2,2, ether, sulfide and sulfone as well as the corresponding isomer mixtures of the individual classes of compounds; 3,3'-dimethyl-, 3,3'-diethyl- and 3,3'-diisopropyl-4,4'-diaminediphenylmethane.

1,6-Hexanediamine, 2,4- and 2,6-hexahydrotoluenediamine and 4,4'-diaminodicyclohexylmethane have proven to work particularly well and are, therefore, used on a preferred basis.

C. The dialdimines to be used in accordance with this invention hydrolyze in the presence of moisture. The hydrolysis rate can be accelerated by adding organic carboxylic acids such as aliphatic and, preferably, aromatic carboxylic acids or aromatic sulfonic acids such as toluenesulfonic acid. Examples include aliphatic carboxylic acids such as formic acid, acetic acid, mono-, di- and trichloroacetic acid, oxalic acid, malonic acid, maleic acid and fumaric acid and aromatic carboxylic acids such as benzoic acid, mono-, di- and trichlorobenzoic acid and salicylic acid.

Preferably used are benzoic acid and 2-chlorobenzoic acid.

Commonly used higher boiling solvents and additives may also be incorporated in the moisture-curing, storage stable, single-component polyurethane systems. These include, for example, fillers, plasticizers, pigments, carbon black, molecular screens, agents to render the systems thixotropic, antioxidants and other similar materials. The advantageous properties of the systems are not impaired by the addition of these substances.

For the preparation of the single-component polyurethane systems according to this invention, the polyurethane prepolymer (A) and the dialdimine (B) are mixed at temperatures of 20° C. to 50° C. and while being stirred in such quantities that the ratio of free isocyanate to aldimine groups is approximately 1.3:1 to 1:1, preferably approximately 1:1. It has proven to be advantageous to have a slight excess of free isocyanate groups in the mixture.

At room temperature 0.1 to 1, preferably 0.2 to 0.6 parts by weight of an aromatic and/or aliphatic carboxylic acid or toluene sulfonic acid is subsequently added to the mixture per 100 parts by weight of components A and B.

The moisture-curing, storage stable, single-component systems according to this invention are stable for more than six months if moisture is excluded. In the presence of moisture, a skin will quickly form and the material will cure. The products are used as coating, sealing, casting, spackling and bonding materials.

Films of such materials excel by high elasticity and low odor.

The amounts shown in the following, non-limiting, examples are parts by weight.

EXAMPLE 1

A. Preparation of the Polyurethane Prepolymer:

One hundred (100) parts by weight of a polyether polyol based on propylene glycol/propylene oxide having a molecular weight of 2000 and 175 parts by weight of a polyether polyol based on glycerin/propylene oxide/ethylene oxide having a molecular weight of 4900 were stirred with 39 parts by weight of 3-isocyanatomethyl-3,5,5-trimethylcyclohexylisocyanate at 70° C. for 3 hours. The mixture was then allowed to cool while being stirred. A polyurethane prepolymer was obtained with a free isocyanate content of 2 percent and a viscosity of 24 Pa.s.

B. Dialdimine from 3-isobutyroxy-2,2-dimethylpropanal and Hexamethylenediamine:

Three hundred and seventy eight (378) parts by weight of 3-isobutyroxy-2,2-dimethylpropanal, 116 parts by weight of hexamethylenediamine and 70 parts by weight of heptane were mixed at room temperature, condensed in the presence of nitrogen at 90° C. for 1 hour and then heated to a maximum of 150° C. to remove water using a water separator. After 3 hours, 36 parts by weight of water was separated. The mixture was then allowed to cool, and the excess aldehyde and the solvent were removed by distillation under a maximum pressure of 10 mbars and a maximum temperature of 150° C.

C. Preparation of the Single-Component Polyurethane System

The polyurethane prepolymer (A) and the dialdimine (B) were mixed in a weight ratio of 100:14.2 by stirring at room temperature. Subsequently, 0.5 part by weight of benzoic acid was added per 100 parts by weight of the mixture.

A moisture-curing, single-component polyurethane system with the following properties was obtained:

| Storage Stability: | > 1 year |
|---|---|
| Skin Formation: | 30 minutes |
| Complete Curing: | 1 mm/20 hours |

EXAMPLE 2

One hundred (100) parts by weight of the single-component polyurethane system according to Example 1 were mixed with 70 parts by weight of chalk and 170 parts by weight of diisodecyl phthalate.

The resultant moisture-curing, single-component system displayed the following properties:

| Storage Stability: | > 1 year |
|---|---|
| Skin Formation: | 45 minutes |
| Complete Curing: | 1 mm/17 hours |

COMPARISON EXAMPLES I-VII

The procedures used were the same as those of Example 1, however, other aldehydes and ketones in equivalent amounts were used (in IB) instead of 3-isobutyroxy-2,2-dimethylpropanal. These resulted in moisture-curing, single-component polyurethane systems with the properties listed in Table I.

TABLE I

Comparison Examples I to VII

| Comparison Example | Aldehyde/Ketone | Storage Stability Under Exclusion of Air | Skin Formation (minutes) |
|---|---|---|---|
| I | Valeraldehyde | Cross-linked after 24 hours | 180 |
| II | Diethylketone | Cross-linked after 24 hours | 1 |
| III | 2-Methoxyacetaldehyde | Immediate cross-linking | — |
| IV | Acetoxypivaldehyde | Cross-linked after 3 weeks | 100 |
| V | Isobutyraldehyde | Cross-linked after 24 hours | 2 |
| VI | Methylisopropylketone | Cross-linked after 24 hours | 2 |
| VII | Dipropylketone | Cross-linked after 24 hours | 2 |
| | Example 1 | Greater than 1 year | 30 |

EXAMPLES 3 TO 10

The procedures used were those of Example 1 but other diamines in equivalent amounts were used (in IB) instead of hexamethylenediamine. In this fashion, dialdimines were obtained which were reacted with an equivalent amount of polyurethane prepolymer (1A) according to (1C) to result in moisture-curing, single-component polyurethane systems. The properties of the resultant products are summarized in Table II.

TABLE II

| Examples | Diamine | Storage Stability of the Single-Component Polyurethane System Under the Exclusion of Moisture | Skin Formation (minutes) |
|---|---|---|---|
| 3 | Ethylenediamine | Greater than 1 year | 30 |
| 4 | 1,3-Propanediamine | Greater than 1 year | 30 |
| 5 | 1,4-Butanediamine | Greater than 1 year | 30 |
| 6 | 1,2-Propylenedimaine | Greater than 1 year | 30 |
| 7 | 3-Aminomethyl-3,5,5-trimethylcyclohexylamine | Greater than 1 year | 75 |
| 8 | 1,2-Diaminocyclohexane | Greater than 1 year | 60 |
| 9 | 4,4'-Diaminobicyclohexyl | Greater than 1 year | 60 |
| 10 | 4,4'-Diaminodiphenylmethane | Greater than 1 year | 150 |

The embodiments of the invention in which an exclusive privilege or property is claimed are defined as follows:

1. Moisture-curing, storage stable, single-component polyurethane composition comprising:
   A. a polyurethane prepolymer having a free isocyanate content of 1 to 5 percent by weight;
   B. a dialdimine chain extender having the formula

R[—N=CH—C(CH₃)₂—CH₂—O—CO—CH(CH₃)₂]₂, in which
   R is a divalent aliphatic radical with 2 to 10 carbon atoms, aliphatic radical having 4 to 10 carbon atoms and containing ether oxygen and/or lower alkylamino nitrogen atoms, cycloaliphatic radical with 6 to 15 carbon atoms, or aromatic radical with 6 to 21 carbon atoms;
   and
   C. an acid catalyst selected from the group consisting of aliphatic carboxylic acids, aromatic carboxylic acids, toluenesulfonic acid, and mixtures thereof.

2. The composition of claim 1 wherein the polyurethane prepolymer (A) is the reaction product of a polyol predominantly with an aliphatic polyisocyanate, a cycloaliphatic polyisocyanate, or both.

3. The composition of claim 2 wherein the ratio of prepolymer to dialdimine used provides 1.0 to 1.05 free isocyanate groups for each aldimine group.

4. The composition of claim 2 wherein the amount of acid used is 0.1 to 1.0 percent by weight of the product.

5. The composition of claim 2 wherein the acid catalyst is benzoic acid.

6. The composition of claim 1 or claim 2 wherein the divalent cycloaliphatic radical has the structure

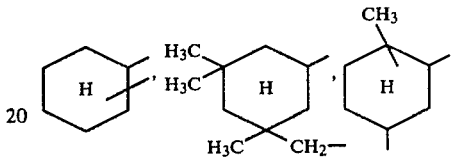

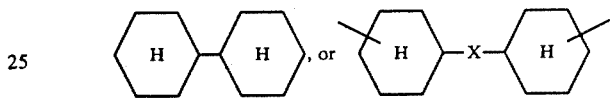

wherein X stands for a —CH₂—, —C(CH₃)₂— —O—, —S— or —SO₂— bridge member.

7. The composition of claim 1 or claim 2 wherein the divalent aromatic radical has the structure

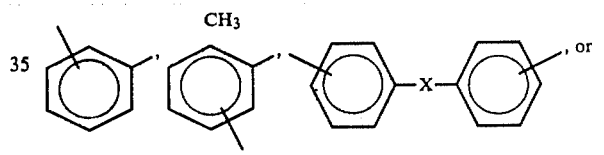

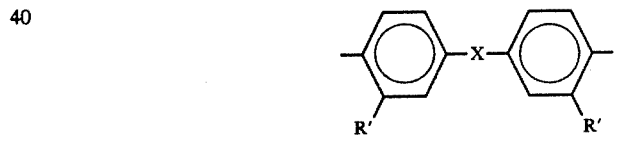

wherein X represents a —CH₂—, —C(CH₃)₂—, —O—, —S— or —SO₂— bridge member and R' stands for a linear or branched alkyl radical with 1 to 3 carbon atoms.

8. The composition comprising:
   A. the composition of claim 2;
   B. a diluent; and
   C. a filler.

9. The composition of claim 8 wherein the diluent is diisodecyl phthalate.

10. The composition of claim 8 wherein the filler is chalk.

* * * * *

UNITED STATES PATENT AND TRADEMARK OFFICE
CERTIFICATE OF CORRECTION

PATENT NO. : 4,469,831
DATED : September 4, 1984
INVENTOR(S) : UWE BUELTJER ET AL It is certified that error appears in the above-identified patent and that said Letters Patent is hereby corrected as shown below:

First page, Bibliographic Data, add Code 30 -
Foreign Application Priority Data - August 21, 1981
(DE) Fed. Rep. of Germany - 3133769; February 24, 1983
(DE) Fed. Rep. of Germany - 3306373.

Signed and Sealed this

Nineteenth Day of February 1985

[SEAL]

Attest:

DONALD J. QUIGG

*Attesting Officer*  *Acting Commissioner of Patents and Trademarks*